United States Patent
Sawada et al.

(10) Patent No.: US 10,266,069 B2
(45) Date of Patent: Apr. 23, 2019

(54) CONTROL DEVICE FOR ELECTRIC MOTOR VEHICLE AND CONTROL METHOD FOR ELECTRIC MOTOR VEHICLE

(71) Applicant: NISSAN MOTOR CO., LTD., Yokohama-shi, Kanagawa (JP)

(72) Inventors: Akira Sawada, Kanagawa (JP); Ken Ito, Kanagawa (JP); Takashi Nakajima, Kanagawa (JP); Yuji Katsumata, Kanagawa (JP); Hiroyuki Komatsu, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 70 days.

(21) Appl. No.: 15/546,096

(22) PCT Filed: Jan. 26, 2015

(86) PCT No.: PCT/JP2015/052080
§ 371 (c)(1),
(2) Date: Jul. 25, 2017

(87) PCT Pub. No.: WO2016/120978
PCT Pub. Date: Aug. 4, 2016

(65) Prior Publication Data
US 2018/0015840 A1 Jan. 18, 2018

(51) Int. Cl.
*B60L 15/20* (2006.01)
*B60L 11/18* (2006.01)
(Continued)

(52) U.S. Cl.
CPC .......... *B60L 15/20* (2013.01); *B60L 7/22* (2013.01); *B60L 2240/423* (2013.01);
(Continued)

(58) Field of Classification Search
None
See application file for complete search history.

(56) References Cited

U.S. PATENT DOCUMENTS

| 2004/0054450 | A1 | 3/2004 | Nakamura et al. |
| 2013/0173127 | A1* | 7/2013 | Nakatsu ................ B60L 3/102 |
| | | | 701/70 |
| 2014/0095006 | A1* | 4/2014 | Saito ...................... B60L 5/045 |
| | | | 701/22 |
| 2014/0207323 | A1 | 7/2014 | Yoshida et al. |
| | | (Continued) | |

FOREIGN PATENT DOCUMENTS

| EP | 3 078 539 A1 | 10/2016 |
| JP | 8-79907 A | 3/1996 |
| | (Continued) | |

*Primary Examiner* — Thomas G Black
*Assistant Examiner* — Demetra R Smith-Stewart
(74) *Attorney, Agent, or Firm* — Foley & Lardner LLP

(57) ABSTRACT

A control device for electric motor vehicle uses the motor as the traveling driving source. The control device for electric motor vehicle is configured to decelerate by the regenerative braking force from the motor. The control device for electric motor vehicle is configured to detect the amount of the accelerator operation, detect the motor rotation speed proportionate to the traveling speed of the electric motor vehicle, and calculate the motor rotation speed estimated value according to the state of the electric motor vehicle. Additionally, the control device for electric motor vehicle is configured to detect or estimate the resistance component unrelated to the gradient from the vehicle state and correct the motor rotation speed estimated value according to the resistance component. Further, the control device for electric motor vehicle is configured to calculate the feedback torque to stop the electric motor vehicle based on the motor rotation speed and calculate the feedforward torque to compensate the feedback torque based on the corrected motor rotation (Continued)

speed estimated value. The control device for electric motor vehicle is configured to calculate the motor torque command value and control the motor based on the calculated motor torque command value. When the amount of the accelerator operation is equal to or less than the predetermined value and the electric motor vehicle is just before the stop of the vehicle, the motor torque command value is converged to 0 based on the feedback torque and the feedforward torque together with the reduction in the traveling speed.

12 Claims, 21 Drawing Sheets

(51) Int. Cl.
  *B60L 7/14* (2006.01)
  *B60L 7/22* (2006.01)
(52) U.S. Cl.
  CPC ........ *B60L 2250/26* (2013.01); *Y02T 10/7241* (2013.01); *Y02T 10/7275* (2013.01)

(56) References Cited

U.S. PATENT DOCUMENTS

| | | | |
|---|---|---|---|
| 2015/0112532 A1 | 4/2015 | Oono et al. | |
| 2016/0159352 A1* | 6/2016 | Kim | B60W 30/143 701/94 |
| 2016/0297303 A1* | 10/2016 | Sawada | B60L 7/14 |
| 2016/0297321 A1 | 10/2016 | Komatsu et al. | |
| 2018/0043792 A1* | 2/2018 | Sawada | B60L 15/20 |

FOREIGN PATENT DOCUMENTS

| | | |
|---|---|---|
| JP | 2001-045613 A | 2/2001 |
| JP | 2002-152916 A | 5/2002 |
| JP | 2011-57025 A | 3/2011 |
| JP | 2013-107543 A | 6/2013 |
| JP | 2013-223373 A | 10/2013 |
| WO | WO-2013/157315 A1 | 10/2013 |

* cited by examiner

CONTROL DEVICE FOR ELECTRIC MOTOR VEHICLE AND CONTROL METHOD FOR ELECTRIC MOTOR VEHICLE

TECHNICAL FIELD

The present invention relates to a control device for electric motor vehicle and a control method for electric motor vehicle.

BACKGROUND ART

Conventionally, a regenerative brake control device for electric vehicles provided with setting means capable of any given setting of a regenerative braking force of a motor and regenerates the motor by a regenerative braking force set by the setting means is known (see JP8-79907A).

SUMMARY OF INVENTION

However, the technique in JP8-79907A has the following problem. If the regenerative braking force set by the setting means is large, vibration in a longitudinal direction of a vehicle body may be generated when the electric vehicle is decelerated by the set regenerative braking force and the speed becomes 0.

An object of the present invention is to provide a technique that reduces the generation of vibration in a longitudinal direction of a vehicle body in stopping an electric motor vehicle with a regenerative braking force.

A device for controlling an electric vehicle according to an embodiment is that a control device for electric motor vehicle uses the motor as the traveling driving source. The control device for electric motor vehicle is configured to decelerate by the regenerative braking force from the motor. The control device for electric motor vehicle is configured to detect the amount of the accelerator operation, detect the motor rotation speed proportionate to the traveling speed of the electric motor vehicle, and calculate the motor rotation speed estimated value according to the state of the electric motor vehicle. Additionally, the control device for electric motor vehicle is configured to detect or estimate the resistance component unrelated to the gradient from the vehicle state and correct the motor rotation speed estimated value according to the resistance component. Further, the control device for electric motor vehicle is configured to calculate the feedback torque to stop the electric motor vehicle based on the motor rotation speed and calculate the feedforward torque to compensate the feedback torque based on the corrected motor rotation speed estimated value. The control device for electric motor vehicle is configured to calculate the motor torque command value and control the motor based on the calculated motor torque command value. When the amount of the accelerator operation is equal to or less than the predetermined value and the electric motor vehicle is just before the stop of the vehicle, the motor torque command value is converged to 0 based on the feedback torque and the feedforward torque together with the reduction in the traveling speed.

Embodiments of the present invention and merits of the present invention will be described below in detail together with the attached drawings.

DESCRIPTION OF EMBODIMENTS

First Embodiment

Figure 1:
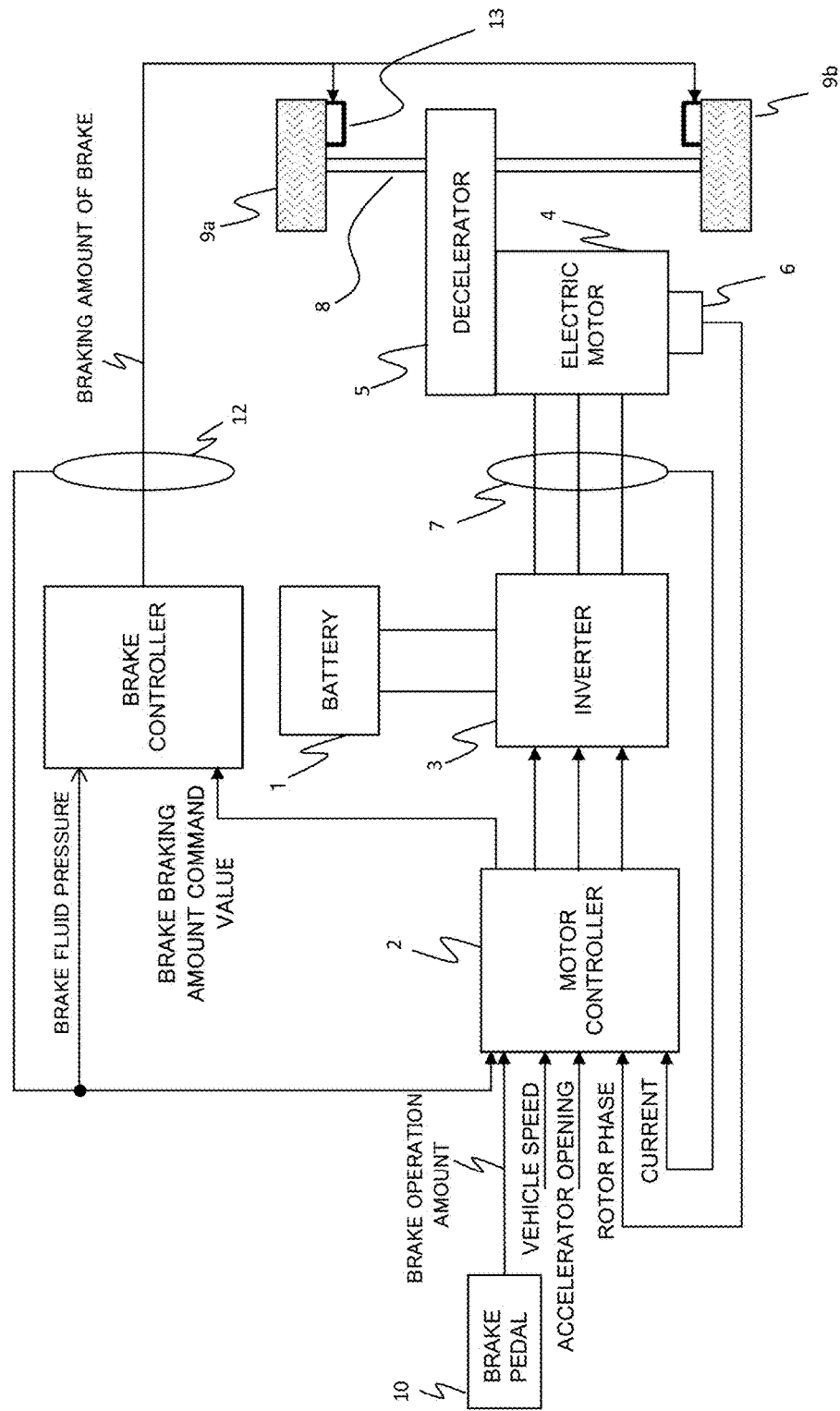
FIG. 1 is a block diagram illustrating a main configuration of an electric vehicle with a control device for electric motor vehicle according to a first embodiment.

FIG. 1 is a block diagram illustrating a main configuration of an electric vehicle with a control device for electric motor vehicle of the first embodiment. The control device for electric motor vehicle of the present invention includes an electric motor 4 as part or the entirety of a drive source of the vehicle and is applicable to an electric motor vehicle capable of traveling by a drive force of the electric motor.

Electric motor vehicles include not only electric vehicles, but also hybrid vehicles and fuel cell vehicles. Particularly, the control device for electric motor vehicle according to the embodiment can be applied to a vehicle capable of controlling acceleration/deceleration and a stop of the vehicle only by an operation of an accelerator pedal. In this vehicle, a driver depresses the accelerator pedal during acceleration and reduces or zeros an amount of depression of the depressed accelerator pedal during deceleration or during stop. It should be noted that, the vehicle approaches the stop state while the driver depresses the accelerator pedal to prevent the vehicle from retreating on uphill roads in some cases.

A motor controller 2 has signals indicating vehicle states such as a vehicle speed V, an accelerator position AP, a rotator phase $\alpha$ of the electric motor (three-phase alternating current motor) 4 and currents iu, iv, and iw of the electric motor 4, which are input to the motor controller 2 in the form of digital signals, and generates PWM signals for controlling the electric motor 4 based on the input signals. The motor controller 2 performs an open/close control of a switching element of an inverter 3 by the generated PWM signal. The motor controller 2 has functions as motor rotation speed estimating means, motor rotation speed estimated value correction means, feedback torque calculating means, feedforward torque calculating means, motor torque command value calculation means, motor control means, and disturbance torque estimating means. The motor rotation speed estimating means calculates a motor rotation speed estimated value, which will be described later. The motor rotation speed estimated value correction means corrects a motor rotation speed estimated value based on an amount of braking of a brake, which will be described later. The feedback torque calculating means calculates a feedback torque, which will be described later. The feedforward torque calculating means calculates a feedforward torque, which will be described later. The motor torque command value calculation means calculates a motor torque command value, which will be described later. The motor control means controls the electric motor 4 based on the motor torque command value. The disturbance torque estimating means estimates a disturbance torque, which will be described later.

The inverter 3 turns on/off, for example, two switching elements (for example, power semiconductor elements such as IGBTs and MOS-FETs) for each phase to convert a direct current supplied from a battery 1 into an alternating current and causes a desired current to flow into the electric motor 4.

The electric motor 4 generates a drive force by the alternating current supplied from the inverter 3 and transmits the drive force to right and left drive wheels 9a, 9b via a speed reducer 5 and a drive shaft 8. Further, when being rotated following the rotation of the drive wheels 9a, 9b during the travel of the vehicle, the electric motor 4 generates a regenerative drive force, thereby collecting the kinetic energy of the vehicle as electrical energy. In this case, the inverter 3 converts an alternating current generated during the regenerative operation of the electric motor 4 into a direct current and supplies the direct current to the battery 1.

A current sensor 7 detects the three-phase alternating currents iu, iv and iw flowing in the electric motor 4. Note that, since the sum of the three-phase alternating currents iu, iv and iw is 0, the currents of any of two phases may be detected and the current of the remaining one phase may be obtained by calculation.

A rotation sensor 6 functions as vehicle speed detecting means to detect a motor rotation speed as a speed parameter. The rotation sensor 6 is, for example, a resolver or an encoder and detects the rotator phase $\alpha$ of the electric motor 4.

A brake controller 11 sets an braking amount B of the brake according to the amount of depression of a brake pedal 10 to control a brake fluid pressure according to the braking amount B of the brake.

A fluid pressure sensor 12 detects the brake fluid pressure to obtain the braking amount B of the brake and outputs the obtained braking amount B of the brake to the motor controller 2. That is, the fluid pressure sensor 12 functions as means to detect the braking amount of the brake as a resistance component unrelated to a gradient.

A friction brake 13 starts the brake fluid pressure according to the braking amount B of the brake to press a brake pad to a rotor, thus generating a braking force in the vehicle.

Figure 2:
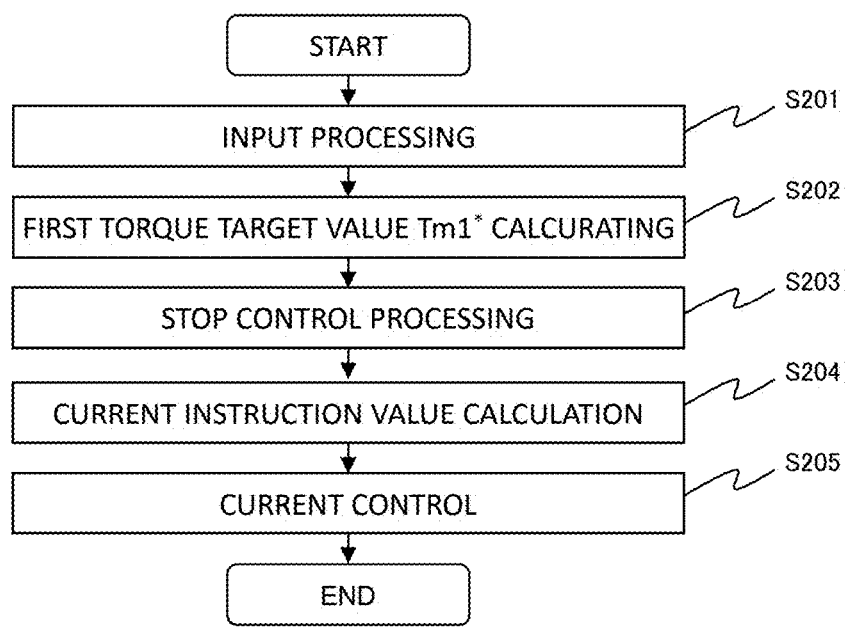
FIG. 2 is a flow of processes for a motor current control performed by a motor controller provided with the control device for electric motor vehicle of the first embodiment.

FIG. 2 is a flowchart showing a flow of processes for a motor current control performed by the motor controller 2.

In Step S201, signals indicating the vehicle states are input. Here, the vehicle speed V (km/h), the accelerator position AP (%), the rotator phase $\alpha$ (rad) of the electric motor 4, a rotation speed Nm (rpm) of the electric motor 4, the three-phase alternating currents iu, iv and iw flowing in the electric motor 4, a direct-current voltage value Vdc (V) between the battery 1 and the inverter 3, and the braking amount B of the brake are input.

The vehicle speed V (km/h) is obtained by a vehicle speed sensor (not illustrated) or through communications from another controller. Alternatively, the vehicle speed v (m/s) is obtained by multiplying a rotator mechanical angular velocity $\omega$m by a tire dynamic radius R and dividing the product by a gear ratio of a final gear, and then multiplied by 3600/1000 for unit conversion, thereby obtaining the vehicle speed V (km/h).

The accelerator position AP (%) is obtained from an accelerator position (not illustrated) or through communications from another controller such as a vehicle controller (not illustrated).

The rotator phase $\alpha$ (rad) of the electric motor 4 is obtained from the rotation sensor 6. The rotation speed Nm (rpm) of the electric motor 4 is obtained by dividing a rotator angular velocity $\omega$ (electric angle) by a pole pair number p of the electric motor 4 to obtain a motor rotation speed $\omega$m (rad/s) (speed parameter), which is a mechanical angular velocity of the electric motor 4, and multiplying the obtained motor rotation speed $\omega$m by 60/(2$\pi$). The rotator angular velocity $\omega$ is obtained by differentiating the rotator phase $\alpha$.

The currents iu, iv and iw (A) flowing in the electric motor 4 are obtained from the current sensor 7.

The direct-current voltage value Vdc (V) is obtained from a voltage sensor (not illustrated) provided in a direct-current power supply line between the battery 1 and the inverter 3 or a power supply voltage value transmitted from a battery controller (not illustrated).

The braking amount B of the brake is obtained from the fluid pressure sensor 12, which detects the brake fluid pressure. A value of, for example, a stroke sensor (not illustrated), which detects an amount of brake operation by the driver, may be used. Alternatively, a brake command value may be obtained from the vehicle controller (not illustrated) and another controller through communications to set the brake command value as the braking amount B of the brake. It should be noted that, when the braking amount B of the brake is set from the sensor value or the command value, responsiveness from when the braking amount B of the brake is input to the vehicle until the braking force actually acts on the vehicle is taken into consideration.

Figure 3:
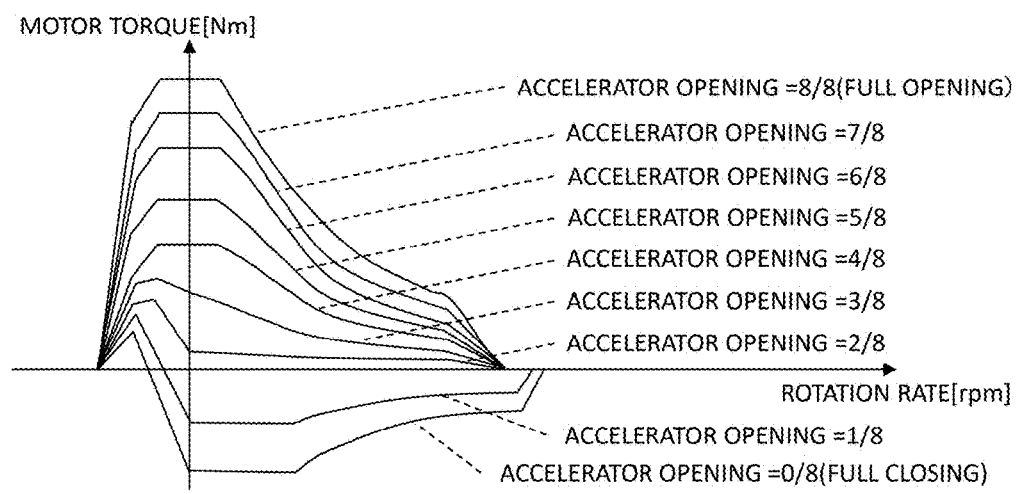
FIG. 3 is a diagram illustrating an example of an accelerator position (accelerator opening degree)-torque table.

In Step S202, a first torque target value Tm1* is set. Specifically, the first torque target value Tm1* is set based on the accelerator position AP and the motor rotation speed ωm input in Step S201 by referring to an accelerator position-torque table illustrated in FIG. 3. As described above, the control device for electric motor vehicle according to the embodiment can be applied to the vehicle capable of controlling acceleration/deceleration and the stop of the vehicle only by the operation of the accelerator pedal. To at least ensure stopping the vehicle by full closing of the accelerator pedal, in the accelerator position-torque table illustrated in FIG. 3, a motor torque is set such that an amount of motor regeneration with the accelerator position of 0 (fully closed) increases. That is, when the motor rotation speed is positive and at least the accelerator position is 0 (fully closed), the negative motor torque is set so as to work the regenerative braking force. Note that, the accelerator position-torque table is not limited to the table illustrated in FIG. 3.

In Step S203, a stop control process is performed. Specifically, whether the electric motor vehicle is just before the stop of the vehicle is determined. The first torque target value Tm1* calculated in Step S202 is set as a motor torque command value Tm* before the electric motor vehicle is just before the stop of the vehicle, and a second torque target value Tm2*, which converges to a disturbance torque command value Td, with a reduction in the motor rotation speed is set as the motor torque command value Tm* after the electric motor vehicle is just before the stop of the vehicle. This second torque target value Tm2* is a positive torque on an uphill road, a negative torque on a downhill road and almost 0 on a flat road. In this way, the vehicle stop state can be maintained regardless of a gradient of a road surface as described later. The detail of the stop control process is described later.

In Step S204, a d-axis current target value id* and a q-axis current target value iq* are obtained based on the motor torque target value Tm* calculated in Step S203, the motor rotation speed ωm, and the direct-current voltage value Vdc. For example, a table obtaining a relationship of the d-axis current target value and the q-axis current target value with the torque command value, the motor rotation speed, and the direct-current voltage value is prepared in advance and the d-axis current target value id* and the q-axis current target value iq* are obtained by referring to this table.

In Step S205, a current control is performed to match a d-axis current id and a q-axis current iq with the d-axis current target value id* and the q-axis current target value iq* obtained in Step S204, respectively. To this end, the d-axis current id and the q-axis current iq are first obtained based on the three-phase alternating current values iu, iv and iw and the rotator phase α of the electric motor 4 input in Step S201. Subsequently, d-axis and q-axis voltage command values vd and vq are calculated from deviations between the d-axis and q-axis current command values id*, iq* and the d-axis and q-axis currents id and iq. It should be noted that a non-interference voltage necessary to cancel out an interference voltage between d-q orthogonal coordinate axes may be added to the calculated d-axis and q-axis voltage command values vd and vq.

Subsequently, from the d-axis and q-axis voltage command values vd and vq and the rotator phase α of the electric motor 4 and from three-phase alternating-current voltage command values vu, vv, and vw and the current voltage value Vdc, PWM signals tu (%), tv (%), and tw (%) are obtained. By opening and closing the switching elements of the inverter 3 by the PWM signals tu, tv and tw obtained in this way, the electric motor 4 can be driven with a desired torque instructed by the torque command value Tm*.

Here, before the stop control process performed in Step S203 is described, a transmission characteristic Gp(s) from the motor torque Tm to the motor rotation speed ωm is described in the control device for electric motor vehicle according to the embodiment.

Figure 4:
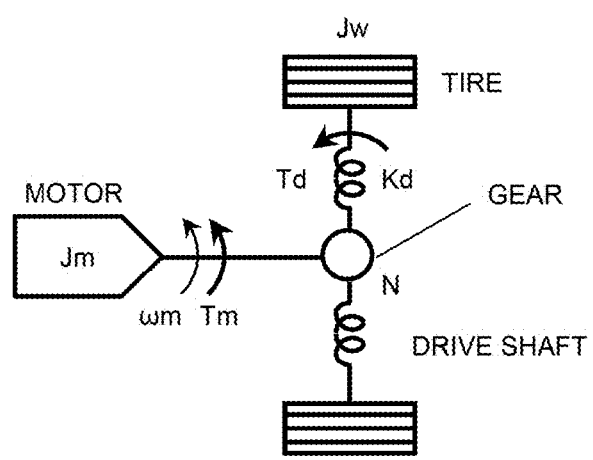
FIG. 4 is a diagram modeling a drive force transmission system of the vehicle.
Figure 5:
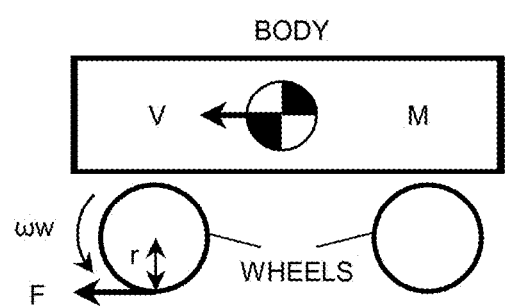
FIG. 5 is a diagram modeling the drive force transmission system of the vehicle.

FIG. 4 and FIG. 5 are diagrams modeling a drive force transmission system of the vehicle, and respective parameters in the diagrams are as described below.

Jm: inertia of electric motor
Jw: inertia of drive wheels
M: weight of vehicle
KD: torsional rigidity of drive system
Kt: coefficient relating friction between tires and road surface
N: overall gear ratio
r: excessive radius of tires
ωm: angular velocity of electric motor
Tm: torque target value Tm*
TD: torque of drive wheels
F: force applied to vehicle
V: speed of vehicle
ωw: angular velocity of drive wheels The following equations of motion can be derived from FIG. 4 and FIG. 5. Note that, the asterisk (*) attached to the right-upper corner of a symbol in the following Equations (1) to (3) indicates a time differential.

[Equation 1]

$$Jm \cdot \omega^* m = Tm - TD/N \tag{1}$$

[Equation 2]

$$2Jw \cdot \omega^* w = TD - rF \tag{2}$$

[Equation 3]

$$MV^* = F \tag{3}$$

[Equation 4]

$$TD = KD \int (\omega m/N - \omega w) dt \tag{4}$$

[Equation 5]

$$F = Kt(r\omega w - V) \tag{5}$$

The transmission characteristic Gp(s) from the torque target value Tm of the electric motor 4 to the motor rotation speed ωm obtained based on the equations of motion (1) to (5) is expressed by the following Equation (6).

[Equation 6]

$$Gp(s) = (b_3 s^3 + b_2 s^2 + b_1 s + b_0)/s(a_4 s^3 + a_3 s^2 + a_2 s + a_1) \tag{6}$$

Here, each parameter in Equation (6) is expressed by the following Equation (7).

[Equation 7]

$$a_4 = 2Jm \cdot Jw \cdot M$$

$$a_3 = Jm(2Jw + Mr^2)Kt$$

$$a_2 = (Jm + 2Jw/N^2)M \cdot KD$$

$$a_1 = (Jm + 2Jw/N^2 + Mr^2/N^2)KD \cdot Kt$$

$$b_3 = 2Jw \cdot M$$

$$b_2 = (2Jw + Mr^2)Kt$$

$b_1 = M \cdot KD$ $b_0 = KD \cdot Kt$ (7)

Through examinations, the poles and 0 point of a transfer function shown in Equation (6) can be approximated to a transfer function of the following Equation (8), and one pole and one 0 point indicate values extremely close to each other. This is equivalent to that α and β of the following Equation (8) indicate values extremely close to each other.

[Equation 8]

$Gp(s) = (s+\beta)(b_2's^2 + b_1's + b_0')/s(s+\alpha)(a_3's^2 + a_2's + a_1')$ (8)

Accordingly, by performing pole-zero cancellation (approximation to α=β) in Equation (8), Gp(s) constitutes a transmission characteristic of (second order)/(third order) as shown in the following Equation (9).

[Equation 9]

$$G'_p(s) = \frac{(b_2''s^2 + b_1''s + b_0'')}{s(a_3''s^2 + a_2''s + a_1'')} \cdot \frac{\beta}{\alpha}$$ (9)

For reduction in operation amount, simplifying a transmission characteristic Gp'(s) can obtain the following Equation (10).

[Equation 10]

$$G''_p(s) = \frac{b_0''}{a_1''s} \cdot \frac{\beta}{\alpha}$$ (10)

The following describes the transmission characteristic Gp(s) from the braking amount B of the brake to the motor rotation speed ωm.

The braking amount B of the brake is the braking force applied to the vehicle. The equation of motion expressed by the following Equation (11) can be derived from FIG. 4 and FIG. 5.

[Equation 11]

$2Jw \cdot \omega^* w = TD - rF - rB$ (11)

Note that, the braking amount B of the brake in Equation (11) is as follows.

$\omega w > 0 : B > 0$ $\omega w = 0 : B = 0$ $\omega w < 0 : B < 0$

To obtain the transmission characteristic Gb(s) from the braking amount B of the brake to the motor rotation speed ωm based on the equations of motion indicated by the Equations (1), (3), (4), (5), and (11), the transmission characteristic Gb(s) is expressed by the following Equation (12).

[Equation 12]

$Gb(s) = (b_1 s + b_0)/s(a_4 s^3 + a_3 s^2 + a_2 s + a_1)$ (12)

Note that, the parameters in Equation (12) are expressed by the following Equation (13).

[Equation 13]

$a_4 = 2Jm \cdot Jw \cdot M \cdot N^2$ $a_3 = (2Jw + Mr^2)Jm \cdot Kt \cdot N^2$ $a_2 = (Jm + N^2 + 2Jw) \cdot M \cdot KD$ $a_1 = (Jm + N^2 + 2Jw + Mr^2) \cdot KD \cdot Kt$ $b_1 = r \cdot M \cdot KD \cdot N$ $b_0 = r \cdot KD \cdot KT \cdot N$ (13)

Figure 6:
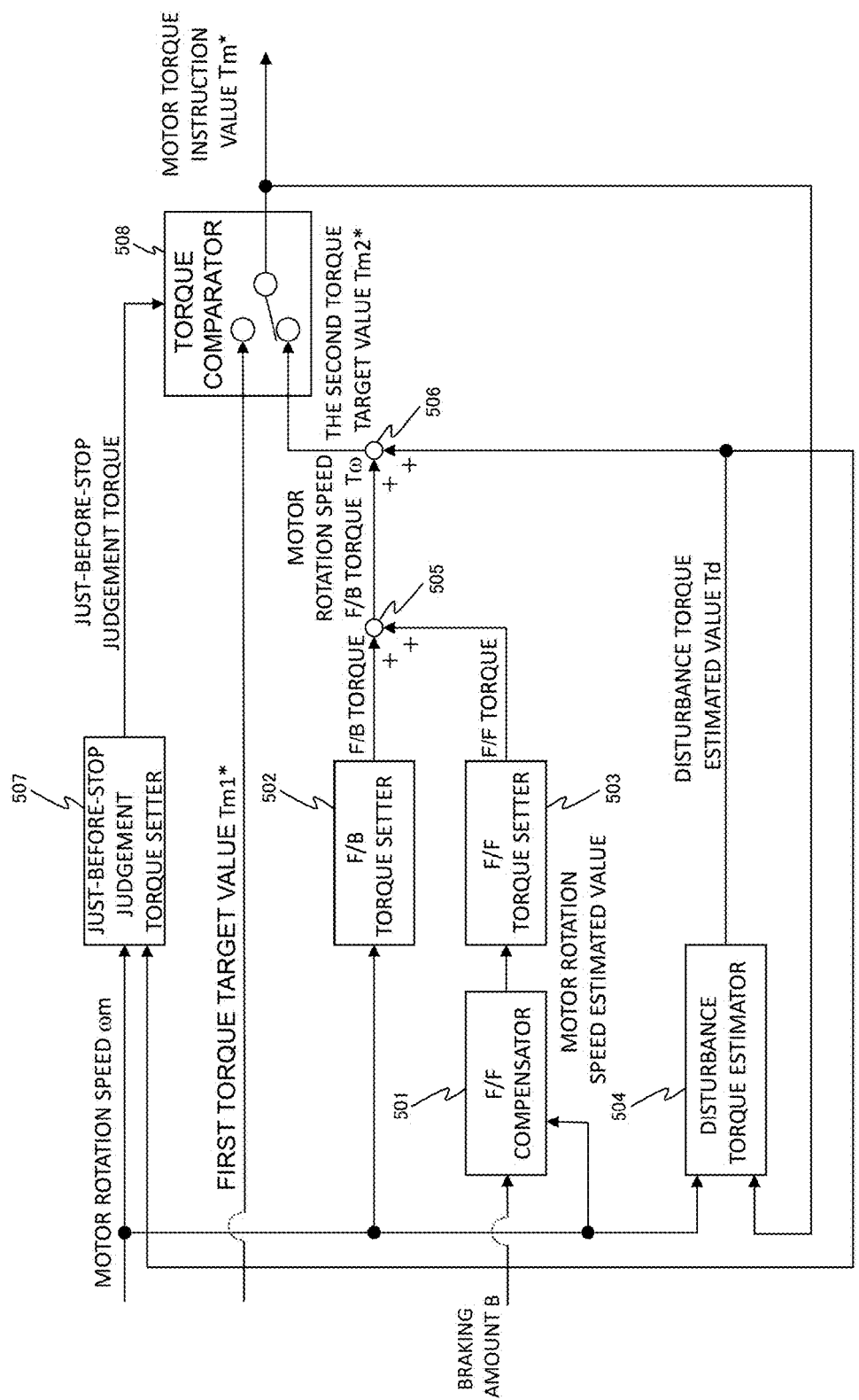
FIG. 6 is a block diagram for achieving a stop control process.

Next, the detail of the stop control process performed in Step S203 of FIG. 2 is described. FIG. 6 is a block diagram for achieving the stop control process.

A feedforward compensator (hereinafter referred to as an F/F compensator) 501 calculates a motor rotation speed estimated value based on the obtained braking amount B of the brake. The following describes details of the F/F compensator 501 with reference to FIG. 7 and FIG. 12.

Figure 7:
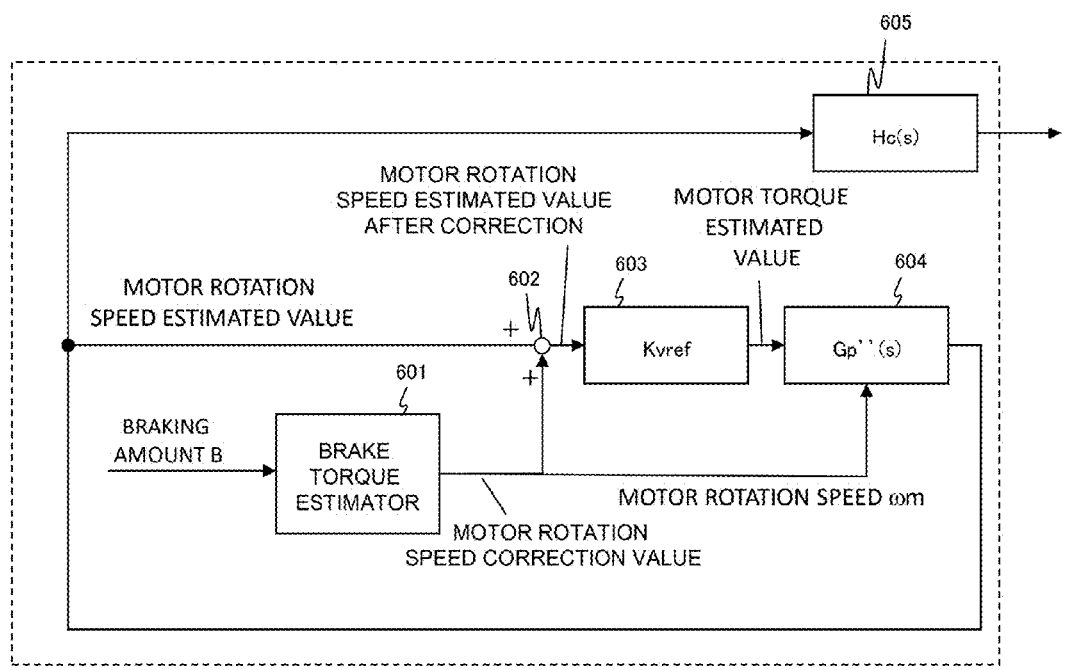
FIG. 7 is a block diagram describing a method for calculating a motor rotation speed estimated value by a feedforward compensator (addition of a response adjusting filter).
Figure 12:
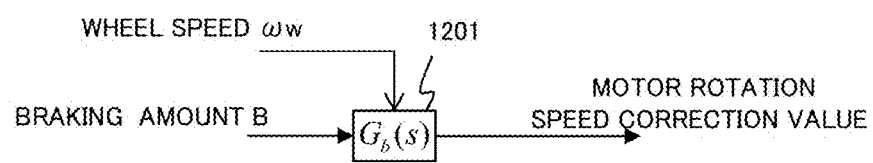
FIG. 12 is a diagram describing a method for calculating a motor rotation speed correction value in the control device for electric motor vehicle of the first embodiment.

FIG. 7 is a diagram describing a method for calculating the motor rotation speed estimated value according to the state of the electric motor vehicle. A brake torque estimator 601 calculates a motor rotation speed correction value to correct the motor rotation speed estimated value based on the braking amount B of the brake. FIG. 12 illustrates details of the brake torque estimator 601.

FIG. 12 is a diagram describing a method for calculating the motor rotation speed correction value according to the braking amount B of the brake. A control block 1201 performs a process of the transmission characteristic Gb(s) expressed by the above-described Equation (12) on the braking amount B of the brake to calculate the motor rotation speed correction value. The braking force by the brake acts in a direction that the motor rotation converges to 0 rpm both in forward movement and backward movement. Accordingly, the motor rotation speed correction value is calculated such that the motor rotation acts in the direction of converging to 0 rpm according to a sign of a vehicle longitudinal speed. The sign of the motor rotation speed correction value in the embodiment is negative during the forward movement of the vehicle and positive during the backward movement of the vehicle. The motor rotation speed correction value is output to an adder 602 illustrated in FIG. 7.

Referring back to FIG. 7, the explanation will be continued. The adder 602 adds the motor rotation speed correction value calculated by the brake torque estimator 601 to the motor rotation speed estimated value to correct the motor rotation speed estimated value. The adder 602 outputs the corrected motor rotation speed estimated value to a control block 603.

A motor torque estimator 603 multiplies the corrected motor rotation speed estimated value output from the adder 602 by a predetermined gain (hereinafter referred to as a total gain) Kvref (Kvref<0) to calculate a motor torque estimated value. The total gain Kvref is a predetermined value to smoothly stop the electric motor vehicle while an extension of a braking distance is reduced, and is, for example, appropriately set by experimental data or similar data.

A motor rotation speed estimator 604 converts the motor torque estimated value into the motor rotation speed estimated value based on the vehicle model Gp(s) indicated by Equation (6). This embodiment uses a vehicle simple model Gp"(s) indicated by Equation (10), instead of the vehicle model Gp(s).

The motor rotation speed estimator 604 inputs the motor torque estimated value calculated by the motor torque estimator 603 to the vehicle simple model Gp"(s) to calculate the motor rotation speed estimated value based on the vehicle simple model Gp"(s). The motor rotation speed estimator 604 outputs the motor rotation speed estimated value based on the vehicle simple model Gp"(s) to the adder 602 and a low-pass filter 605.

In the case where a torque comparator 508, which will be described later, determines that the electric motor vehicle is just before the stop of the vehicle and the case where the braking amount B of the brake is released, the motor rotation speed estimator 604 initializes the vehicle simple model Gp"(s) based on the current motor rotation speed ωm. For example, the vehicle simple model Gp"(s) is constituted of constants $a_1'$ and $b_0'$, which are uniquely decided by a design value of the vehicle, and an integrator. When the motor rotation speed estimator 604 determines that the electric motor vehicle is just before the stop of the vehicle, setting the initial value of the above-described integrator to the motor rotation speed ωm initializes the vehicle simple model Gp"(s). During the braking of the brake, due to a change in a friction coefficient (μ) of the brake pad or a similar cause, an error occurs in the command value and the sensor value; and the braking force actually acting on the vehicle. Accordingly, the above-described initialization cancels the error occurred during the braking of the brake.

The low-pass filter 605 is a low-pass filter with a transmission characteristic Hc(s) configured to complement the vehicle simple model Gp"(s). Here, a filtering process of the transmission characteristic Hc(s) is performed on the motor rotation speed estimated value calculated by the motor rotation speed estimator 604 for response adjustment. The transmission characteristic Hc(s) is set based on, for example, a simulation or experimental data. Specifically, with the total gain Kvref smaller than 0, a time constant of the transmission characteristic Hc(s) is adjusted such that the convergence of the motor rotation speed ωm and the convergence of the motor rotation speed estimated value input to an F/F torque setting device 503 to be equivalent.

Thus, the low-pass filter process is performed on the motor rotation speed estimated value input to the F/F torque setting device 503. This corrects a discrepancy of the response characteristic in association with the use of the vehicle simple model Gp"(s).

Referring back to FIG. 6, the explanation will be continued. A feedback torque setting device (hereinafter referred to as an F/B torque setting device) 502 illustrated in FIG. 6 calculates an F/B torque based on the detected motor rotation speed ωm. The following describes the details with reference to FIG. 8.

Figure 8:
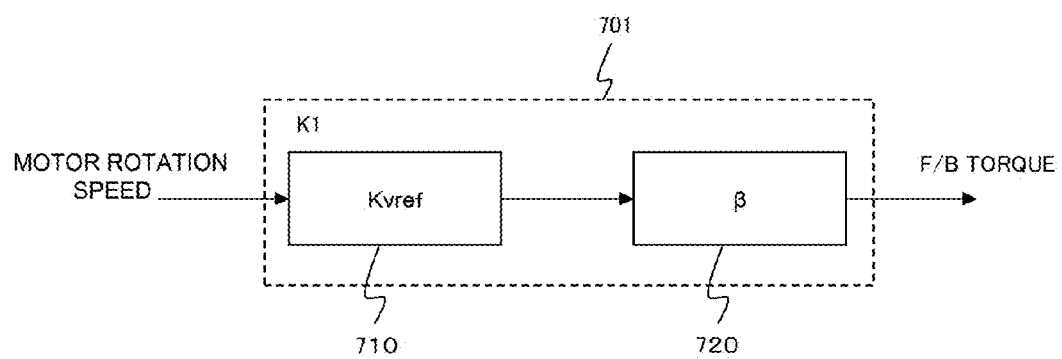
FIG. 8 is a diagram describing a method for calculating an F/B torque based on a motor rotation speed.

FIG. 8 is a diagram describing a method for calculating the F/B torque based on the motor rotation speed ωm. The F/B torque setting device 502 includes a multiplier 701 to convert the motor rotation speed ωm into the F/B torque.

The multiplier 701 includes a total gain multiplier 710 and a distribution coefficient multiplier 720. The multiplier 701 multiplies the motor rotation speed ωm by an F/B gain K1 (Kvref×β), which is determined to distribute the regenerative braking force by the electric motor, 4 to calculate the F/B torque. The F/B gain K1 is set in a direction of weakening the regenerative braking force compared with the total gain Kvref. That is, the F/B gain K1 is set to a value smaller than 0 and larger than the total gain Kvref.

The total gain multiplier 710 multiplies the motor rotation speed ωm by the total gain Kvref to calculate an F/B total torque.

The distribution coefficient multiplier 720 multiplies the F/B total torque by the distribution coefficient β to calculate the F/B torque. Note that, the distribution coefficient β is a value larger than "0" and smaller than "1." The distribution coefficient β is set based on, for example, a simulation or experimental data.

Thus, the multiplier 701 uses the value obtained by multiplying the total gain Kvref by the distribution coefficient β as the F/B gain K1, ensuring the F/B torque small so as to decrease the regenerative braking force. The motor rotation speed ωm is multiplied by the F/B gain K1 to calculate the F/B torque; therefore, the F/B torque is set as a torque from which the large regenerative braking force is obtained with the larger motor rotation speed ωm.

The following describes a configuration of the F/F torque setting device 503 illustrated in FIG. 6.

The F/F torque setting device 503 calculates the F/F torque based on the motor rotation speed estimated value calculated by the F/F compensator 501. The F/F torque supplements the insufficient regenerative braking force by the F/B torque just before the stop of the vehicle.

Figure 9:
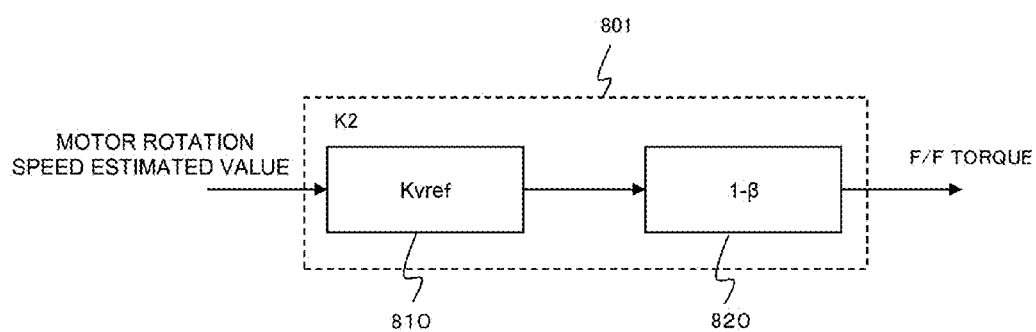
FIG. 9 is a diagram describing a method for calculating an F/F torque based on the motor rotation speed estimated value.

FIG. 9 is a diagram describing a method for calculating the F/F torque based on the motor rotation speed estimated value. The F/F torque setting device 503 includes a multiplier 801 to convert the motor rotation speed estimated value into the F/F torque.

The multiplier 801 multiplies the motor rotation speed estimated value by an F/F gain K2 set according to the F/B gain K1 to calculate the F/F torque. The multiplier 801 includes a total gain multiplier 810 and a distribution coefficient multiplier 820.

The total gain multiplier 810 multiplies the motor rotation speed estimated value by the total gain Kvref to calculate an F/F total torque.

The distribution coefficient multiplier 820 multiplies the F/F total torque by the distribution coefficient (1−β) to calculate the F/F torque. Note that, as described in FIG. 8, since the distribution coefficient β is a value larger than "0" and is smaller than "1," the distribution coefficient (1−β) is a value larger than "0" and smaller than "1."

Thus, the multiplier 801 uses the value obtained by multiplying the total gain Kvref by the distribution coefficient (1−β) as the F/F gain K2, ensuring assigning the amount of decreasing the F/B torque by the F/B torque setting device 502 to the F/F torque. The motor rotation speed estimated value is multiplied by the F/F gain K2 to calculate the F/F torque; therefore, the F/F torque is set as a torque from which the large regenerative braking force is obtained with the larger motor rotation speed estimated value.

Figure 10:
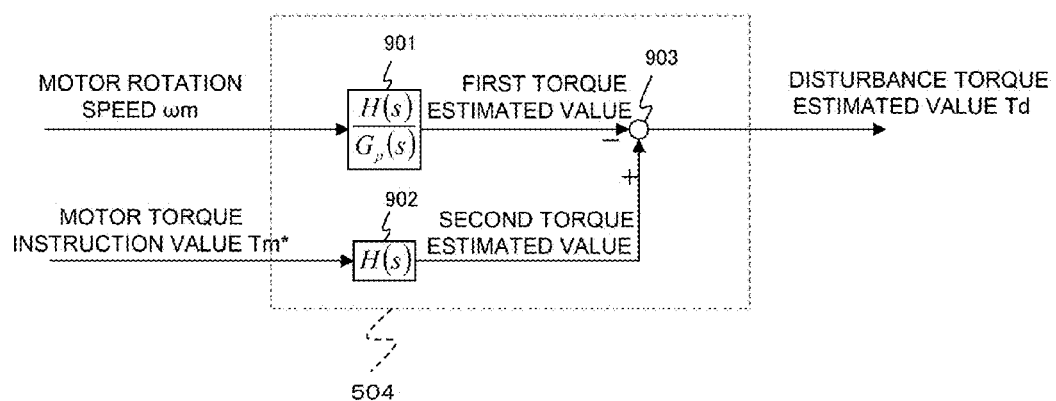
FIG. 10 is a diagram describing a method for calculating a disturbance torque estimated value.

The following describes a configuration of a disturbance torque estimator 504 illustrated in FIG. 6 with reference to FIG. 10.

FIG. 10 is a block diagram illustrating details of the disturbance torque estimator 504 and to calculate the disturbance torque estimated value Td based on the motor rotation speed ωm and the motor torque command value Tm*. The disturbance torque estimator 504 calculates the disturbance torque estimated value Td based on the detected motor rotation speed ωm and the motor torque command value Tm*.

A control block 901 functions as a filter having a transmission characteristic H(s)/Gp(s) and inputs the motor rotation speed ωm and performs the filtering process, thus calculating a first motor torque estimated value. Gp(s) is a vehicle model for the transmission characteristic of the torque input to the vehicle and the rotation speed of the motor. H(s) is a low-pass filter having such a transmission characteristic that a difference between the denominator degree and the numerator degree is equal to or more than a difference between the denominator degree and the numerator degree of a model Gr(s).

A control block 902 functions as a low-pass filter having a transmission characteristic H(s) and inputs the motor torque command value Tm* and performs the filtering process, thus calculating a second motor torque estimated value.

It should be noted that, in the calculation of the second motor torque estimated value, the resistances unrelated to the gradient such as the braking amount of the brake, an air resistance, a rolling resistance, and a turning resistance may be considered.

A subtractor 903 calculates the disturbance torque estimated value Td by subtracting the first motor torque estimated value from the second motor torque estimated value.

It should be noted that although the disturbance torque according the embodiment is estimated by a disturbance observer as illustrated in FIG. 10, it may be estimated using a meter such as a vehicle longitudinal G sensor.

Here, while the air resistance, a modeling error caused by a variation of a vehicle weight due to the number of passengers and load capacity, a rolling resistance of the tires, a gradient resistance of the road surface, and a similar resistance are thought as the disturbances, a disturbance factor dominant just before the stop of the vehicle is the gradient resistance. While the disturbance factors differ depending on driving conditions, the disturbance factors described above can be collectively estimated since the disturbance torque estimator 504 calculates the disturbance torque estimated value Td based on the motor torque command value Tm*, the motor rotation speed tam, and the vehicle model Gp(s). This achieves a smooth vehicle stop from deceleration under any driving condition. Note that, as described above, since the disturbance torque on the flat road is almost 0, when the vehicle is just before the stop of the vehicle on the flat road, the motor torque command value Tm* may be converged to 0, eliminating the need for the calculation of the disturbance torque estimated value Td.

Returning to FIG. 6, the explanation will be continued. The following describes configurations other than the F/F compensator 501, the F/B torque setting device 502, the F/F torque setting device 503, and the disturbance torque estimator 504.

An adder 505 adds the F/B torque calculated by the F/B torque setting device 502 and the F/F torque calculated by the F/F torque setting device 503 to calculate a motor rotation speed F/B torque Tω.

An adder 506 adds the motor rotation speed F/B torque Tω calculated by the adder 505 and the disturbance torque estimated value Td calculated by the disturbance torque estimator 504 to calculate the second torque target value Tm2*.

A just-before-stop determining torque setting device 507 calculates a just-before-stop determining torque based on the detected motor rotation speed ωm and the disturbance torque estimated value Td.

Figure 11:
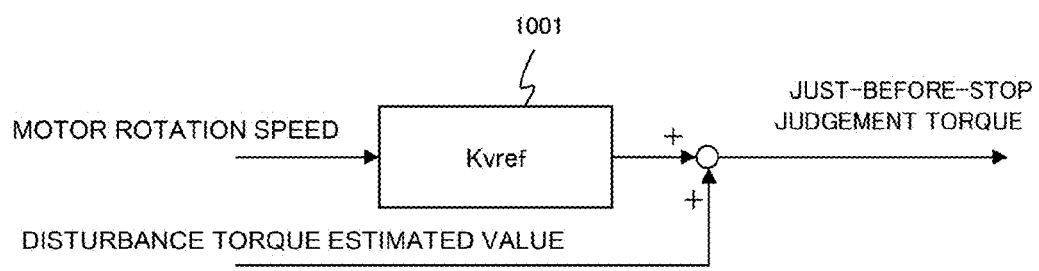
FIG. 11 is a diagram describing a method for calculating a just-before-stop determining torque based on a motor rotation speed and the disturbance torque estimated value.

Here, the following describes the calculation of the just-before-stop determining torque with reference to FIG. 11. FIG. 11 is a block diagram describing a method for calculating the just-before-stop determining torque based on the motor rotation speed ωm. The just-before-stop determining torque setting device 507 includes a multiplier 1001. The just-before-stop determining torque setting device 507 adds the disturbance torque estimated value Td to a value obtained by multiplying the motor rotation speed ωm by the total gain Kvref to calculate the just-before-stop determining torque.

Returning to FIG. 6, the following describes the configuration of the torque comparator 508.

The torque comparator 508 compares magnitudes between the first torque target value Tm1*, which is calculated in Step S202, and the just-before-stop determining torque, which is calculated by the just-before-stop determining torque setting device 507.

During the travelling of the vehicle, when the just-before-stop determining torque is smaller than the first torque target value Tm1*, and the vehicle decelerates and becomes just before the stop of the vehicle (the vehicle speed is equal to or less than a predetermined vehicle speed), the just-before-stop determining torque becomes larger than the first torque target value Tm1*. When the just-before-stop determining torque becomes larger than the first torque target value Tm1*, the torque comparator 508 determines that the vehicle is just before stop of the vehicle and switches the motor torque command value Tm* from the first torque target value Tm1* to the second torque target value Tm2*.

Thus, when the torque comparator 508 determines that the just-before-stop determining torque is equal to or smaller than the first torque target value Tm1*, the torque comparator 508 determines that the vehicle is prior to just before the stop of the vehicle and sets the first torque target value Tm1* to the motor torque command value Tm*. Meanwhile, when the torque comparator 508 determines that the just-before-stop determining torque is larger than the first torque target value Tm1*, the torque comparator 508 determines that the vehicle is just before the stop of the vehicle and switches the motor torque command value Tm* from the first torque target value Tm1* to the second torque target value Tm2*.

It should be noted that, to maintain the vehicle stop state, the second torque target value Tm2* converges to the positive torque on the uphill road, the negative torque on the downhill road, and almost 0 on the flat road.

Figure 13:
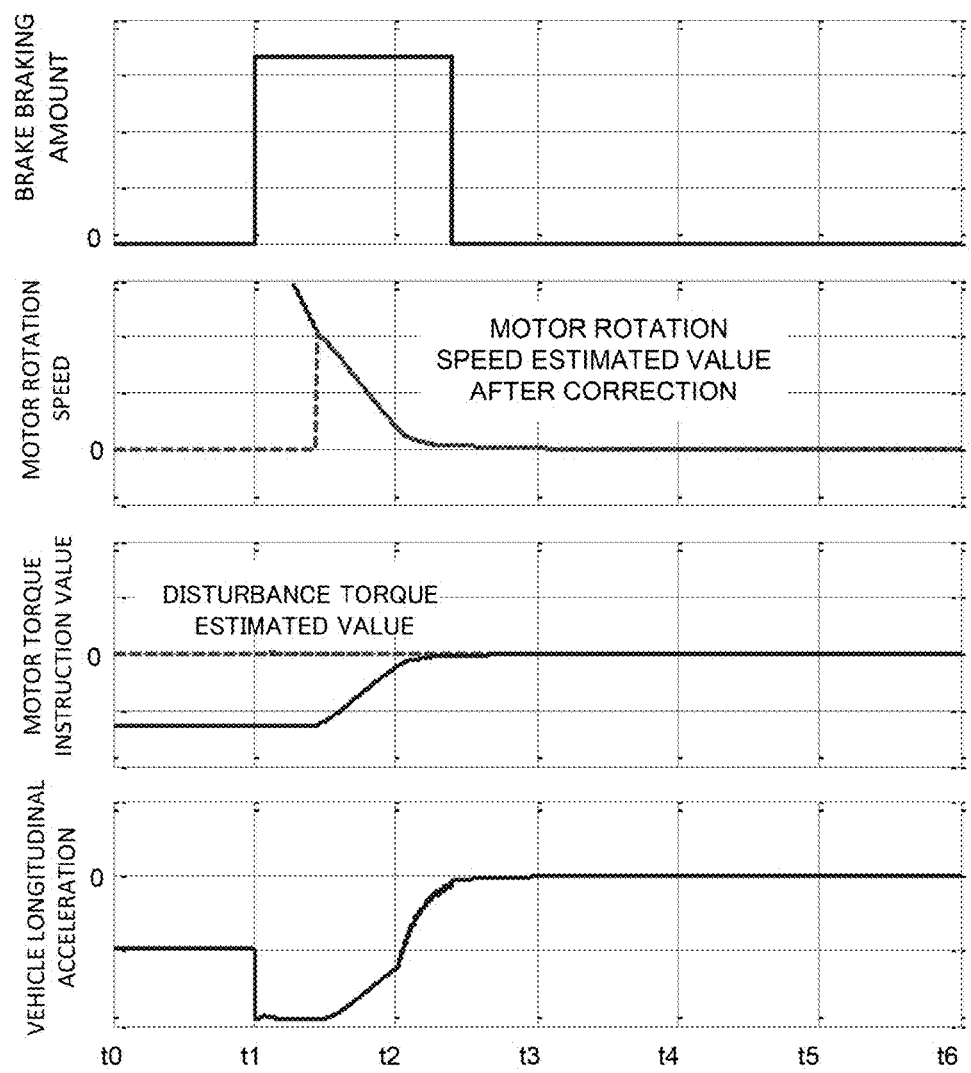
FIG. 13 are diagrams illustrating examples of control results by the control device for electric motor vehicle of the first embodiment.
Figure 14:
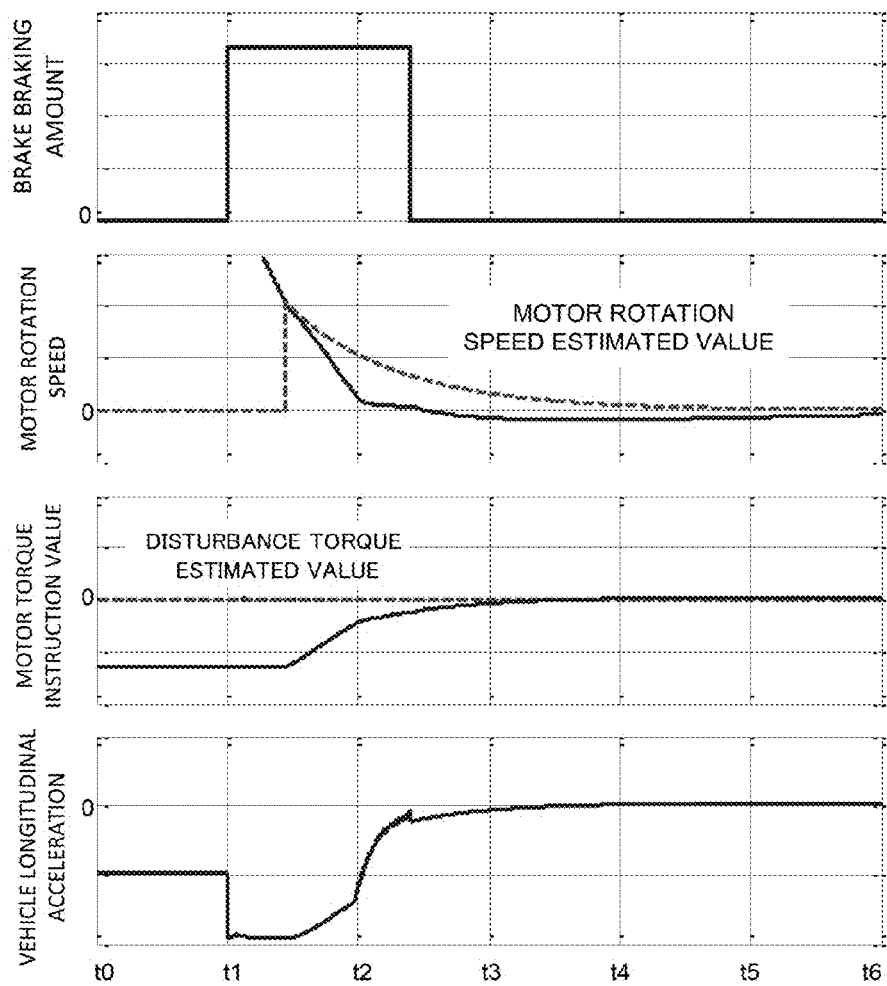
FIG. 14 are diagrams illustrating examples of control results of a comparative example.

The following describes effects when the control device for electric motor vehicle according to the embodiment is applied to the electric vehicle, especially describes a control during the braking of the brake with reference to FIG. 13 and FIG. 14.

FIG. 13 are diagrams illustrating examples of the control results by the control device for electric motor vehicle according to the embodiment. FIG. 13 illustrates the control results when the vehicle stops on the flat road. FIG. 13 shows the braking amount of the brake, the motor rotation speed, the motor torque command value, and a vehicle longitudinal acceleration in the order from the above. The dotted line in the diagram expressing the motor rotation speed shows the corrected motor rotation speed estimated value and the dotted line in the diagram expressing the motor torque command value shows the disturbance torque estimated value.

At a time t0, the electric motor 4 is decelerated based on the first torque target value Tm1* calculated in Step S202 in FIG. 2. The disturbance torque estimated value is 0; therefore, it is seen that the vehicle travels on the flat road.

At a time t1, when the driver depresses the brake pedal, the braking amount B of the brake increases. At this time, it is seen that the use of the first torque target value Tm1* and the braking amount B of the brake in combination increases the vehicle longitudinal acceleration in the negative direction, namely, the braking side.

From the time t1 to t2, when the torque comparator 508 determines that the just-before-stop determining torque is larger than the first torque target value Tm1*, the torque comparator 508 determines that the vehicle is just before the stop of the vehicle and switches the first torque target value Tm1* calculated in Step S202 to the second torque target value Tm2* calculated in Step S203 for deceleration. At this time, for the calculation of the motor rotation speed estimated value by the F/F compensator 501, the correction is made considering the braking amount B of the brake. Therefore, it is seen that the motor rotation speed matches the corrected motor rotation speed estimated value.

When the torque comparator 508 determines that the vehicle is just before the stop of the vehicle, the simple vehicle model Gp"(s) constituting the motor rotation speed estimator 604 in FIG. 7 is initialized by the motor rotation speed ωm to be set as an initial value of the motor rotation speed estimated value output from the F/F compensator 501.

From the time t2 to t3, even if the braking amount B of the brake is released, the motor rotation speed, the motor torque command value, and the vehicle longitudinal speed are converged to 0. It can be seen that the vehicle can smoothly stop without involving the acceleration vibration in the longitudinal direction.

Even at the time t3 and after the time t3, the motor rotation speed, the motor torque command value, and the vehicle longitudinal speed still converge to 0. It is seen that the vehicle stop state can be held.

The following describes the control results in the case where the braking amount B of the brake is not considered to calculate the motor rotation speed estimated value by the F/F compensator 501 as a comparative example with reference to FIG. 14.

At a time t0, the electric motor 4 is decelerated based on the first torque target value Tm1* calculated in Step S202 in FIG. 2. The disturbance torque estimated value is 0; therefore, it is seen that the vehicle travels on the flat road.

At a time t1, when the driver depresses the brake pedal, the braking amount B of the brake increases. At this time, it is seen that the use of the first torque target value Tm1* and the braking amount B of the brake in combination increases the vehicle longitudinal acceleration in the negative direction, namely, the braking side.

From the time t1 to t2, when the torque comparator 508 determines that the just-before-stop determining torque is larger than the first torque target value Tm1*, the torque comparator 508 determines that the vehicle is just before the stop of the vehicle and switches the first torque target value Tm1* calculated in Step S202 to the second torque target value Tm2* calculated in Step S203 for deceleration. At this time, for the calculation of the motor rotation speed estimated value by the F/F compensator 501, the braking amount B of the brake is not considered. Therefore, it is seen that the motor rotation speed deviates from the motor rotation speed estimated value.

When the torque comparator 508 determines that the vehicle is just before the stop of the vehicle, the simple vehicle model Gp"(s) constituting the motor rotation speed estimator 604 in FIG. 7 is initialized by the motor rotation speed ωm to be set as an initial value of the motor rotation speed estimated value output from the F/F compensator 501.

From a time t2 to t3, the combination use of the second torque target value and the braking amount B of the brake once converges the vehicle longitudinal acceleration to 0 and the vehicle attempts to enter the vehicle stop state. However, it is seen that, when the braking amount of the brake is released, the vehicle longitudinal acceleration increases in the negative direction, namely, the retreat side, thus retreating the vehicle. This occurs because the electric motor 4 is decelerated based on the second torque target value Tm2* calculated based on the motor rotation speed estimated value calculated without taking the braking amount B of the brake into consideration by the F/F compensator 501.

From a time t3 to t5, the motor rotation speed indicates the negative value. It is seen that that the vehicle retreats and fails to smoothly stop. This occurs because the braking force of the vehicle by the braking amount of the brake is lost due to the release of the braking amount of the brake.

It should be noted that, at a time t6, the motor rotation speed estimated value almost converges to 0 and the retreat speed is controlled compared with the time point of t4.

As described above, according to the first embodiment, the control device for electric motor vehicle uses the motor as the traveling driving source. The control device for electric motor vehicle is configured to decelerate by the regenerative braking force from the motor. The control device for electric motor vehicle is configured to detect the amount of the accelerator operation, detect the motor rotation speed proportionate to the traveling speed of the electric motor vehicle, and calculate the motor rotation speed estimated value according to the state of the electric motor vehicle. Additionally, the control device for electric motor vehicle is configured to detect or estimate the resistance component unrelated to the gradient from the vehicle state and correct the motor rotation speed estimated value according to the resistance component. Further, the control device for electric motor vehicle is configured to calculate the feedback torque to stop the electric motor vehicle based on the motor rotation speed and calculate the feedforward torque to compensate the feedback torque based on the corrected motor rotation speed estimated value. The control device for electric motor vehicle is configured to calculate the motor torque command value and control the motor based on the calculated motor torque command value. When the amount of the accelerator operation is equal to or less than the predetermined value and the electric motor vehicle is just before the stop of the vehicle, the motor torque command value is converged to 0 based on the feedback torque and the feedforward torque together with the reduction in the traveling speed. This detects or estimates the resistances unrelated to the gradient such as the braking amount of the brake, the air resistance, the rolling resistance, and the turning resistance and corrects the motor rotation speed estimated value, thus ensuring matching the motor rotation speed estimated value with the motor rotation speed. This allows the motor torque to be converged to 0 together with the reduction in motor rotation speed. Therefore, even if the resistance unrelated to the gradient is input to the vehicle as the disturbance, this allows the smooth stop of the vehicle without involving the acceleration vibration in the longitudinal direction and holding the vehicle stop state.

It should be noted that, the amount of accelerator operation is equal to or less than the predetermined value intends the amount of accelerator operation when the vehicle sufficiently travels at a low speed (for example, a speed of 15 km/h or less) without an intervention of a braking device separate from the regeneration braking. It should be noted that, needless to say, the exemplary vehicle speed is one example.

With the first embodiment, the detected motor rotation speed is multiplied by the predetermined gain K1 to distribute the regenerative braking force from the motor to calculate the feedback torque. Additionally, the corrected motor rotation speed is multiplied by the specific gain K2 set according to the predetermined gain K1 to calculate the feedforward torque. When the amount of accelerator operation is equal to or less than the predetermined value and the electric motor vehicle is just before the stop of the vehicle, the feedback torque obtained by adding the feedforward torque calculated by the multiplication of K2 to the feedback torque calculated by the multiplication of K1 is set as the motor torque command value. This appropriately distributes the feedforward torque and the feedback torque, thereby ensuring smoothly stopping the electric motor vehicle while the extension of the braking distance is reduced.

With the first embodiment, the resistance component unrelated to the gradient is the braking amount of the brake that applies the braking force to the vehicle. The motor rotation speed correction value is calculated from the braking amount of the brake to correct the motor rotation speed estimated value based on the calculated motor rotation speed correction value. Accordingly, in the case where the braking force is applied to the vehicle except for the regenerative braking by the motor, the motor torque can also be converged to 0 together with the reduction in motor rotation speed. Therefore, even if the braking amount of the brake is input to the vehicle, the vehicle can smoothly stop and the vehicle stop state can be held.

With the first embodiment, the amount of brake operation by the driver can be detected, and the braking amount of the brake is decided based on the detected amount of brake operation. This allows the correction of the motor rotation speed estimated value based on the sensor value detected by a brake fluid pressure sensor, a brake pedal stroke sensor, or a similar device, thereby ensuring the correction based on the actual measured value of the vehicle.

The braking amount of the brake may be decided based on the command value regarding the brake operation (such as an braking amount of the brake command value). This ensures deciding the disturbance torque estimated value without a dead time such as a sensor detection delay.

The braking amount of the brake is decided considering the responsiveness from when the braking amount of the brake is input to the vehicle until the braking force acts on the vehicle. Accordingly, the braking amount of the brake considers the responsiveness such as a response from the braking amount of the brake command value until the start of the brake fluid pressure and a response from the start of the brake fluid pressure until the action of the braking force to the vehicle, thereby ensuring restraining a model error between the vehicle model and the actual vehicle.

With the first embodiment, the mark for the motor rotation speed correction value differs depending on the traveling direction of the vehicle. Accordingly, according to the vehicle longitudinal speed (including the speed parameters of the vehicle such as a vehicle body speed, a wheel speed, the motor rotation speed, and a drive shaft rotation speed), the mark for the braking amount of the brake is inverted and the motor rotation speed correction value is calculated. This allows appropriately correcting the motor rotation speed both in the forward movement and the backward movement of the vehicle.

With the first embodiment, the motor rotation speed correction value is calculated using the filter including the model Gb(s) for the transmission characteristic of the input of the braking amount of the brake to the vehicle and the rotation speed of the motor. This allows accurately canceling the braking amount of the brake from the motor rotation speed correction value.

Furthermore, releasing the braking amount of the brake initializes the motor rotation speed estimated value by the motor rotation speed. This allows cancelling the error occurred in the braking of the brake.

The first embodiment estimates the disturbance torque, and when the amount of accelerator operation is equal to or less than the predetermined value and the electric motor vehicle is just before the stop of the vehicle, the motor torque command value Tm* is converged to the disturbance torque estimated value Td together with the reduction in the motor rotation speed. Therefore, regardless of the uphill road, the flat road, and the downhill road, this embodiment achieves the smooth deceleration without the acceleration vibration in the longitudinal direction just before the stop of the vehicle and ensures holding the vehicle stop state.

Second Embodiment

A control device for electric motor vehicle of the second embodiment uses a vibration damping control together in addition to the above-described first embodiment. The following describes the control device for electric motor vehicle in this embodiment, especially aspects of the combination use of the vibration damping control.

Figure 15:
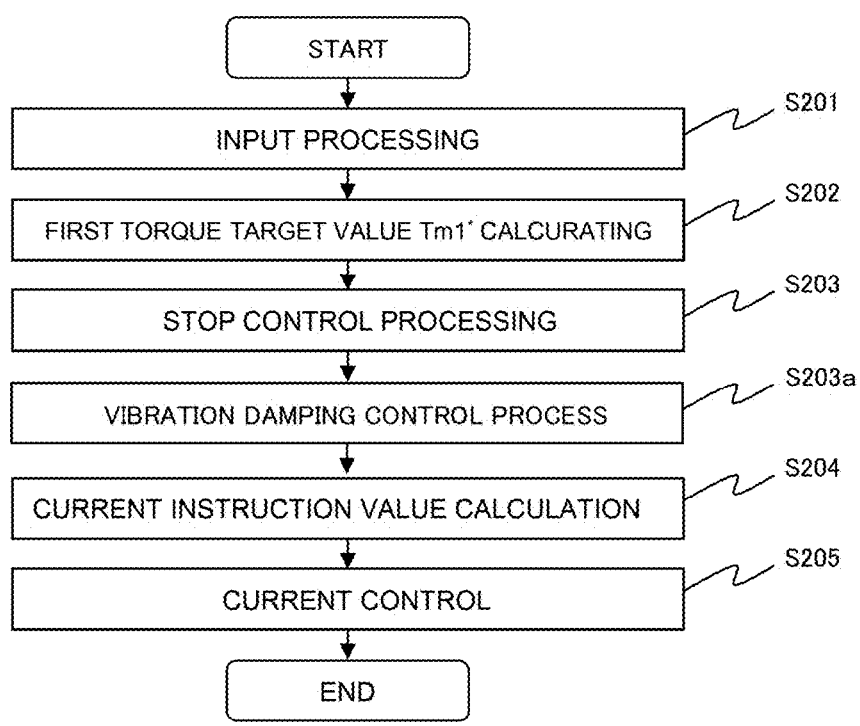
FIG. 15 is a flow of processes for a motor current control performed by a motor controller provided with a control device for electric motor vehicle of a second embodiment.

FIG. 15 is a control flowchart for the motor control of the control device for electric motor vehicle of the second embodiment. In addition to the control sequence in the first embodiment illustrated in FIG. 2, the vibration damping control process is performed in Step S203a.

Figure 16:
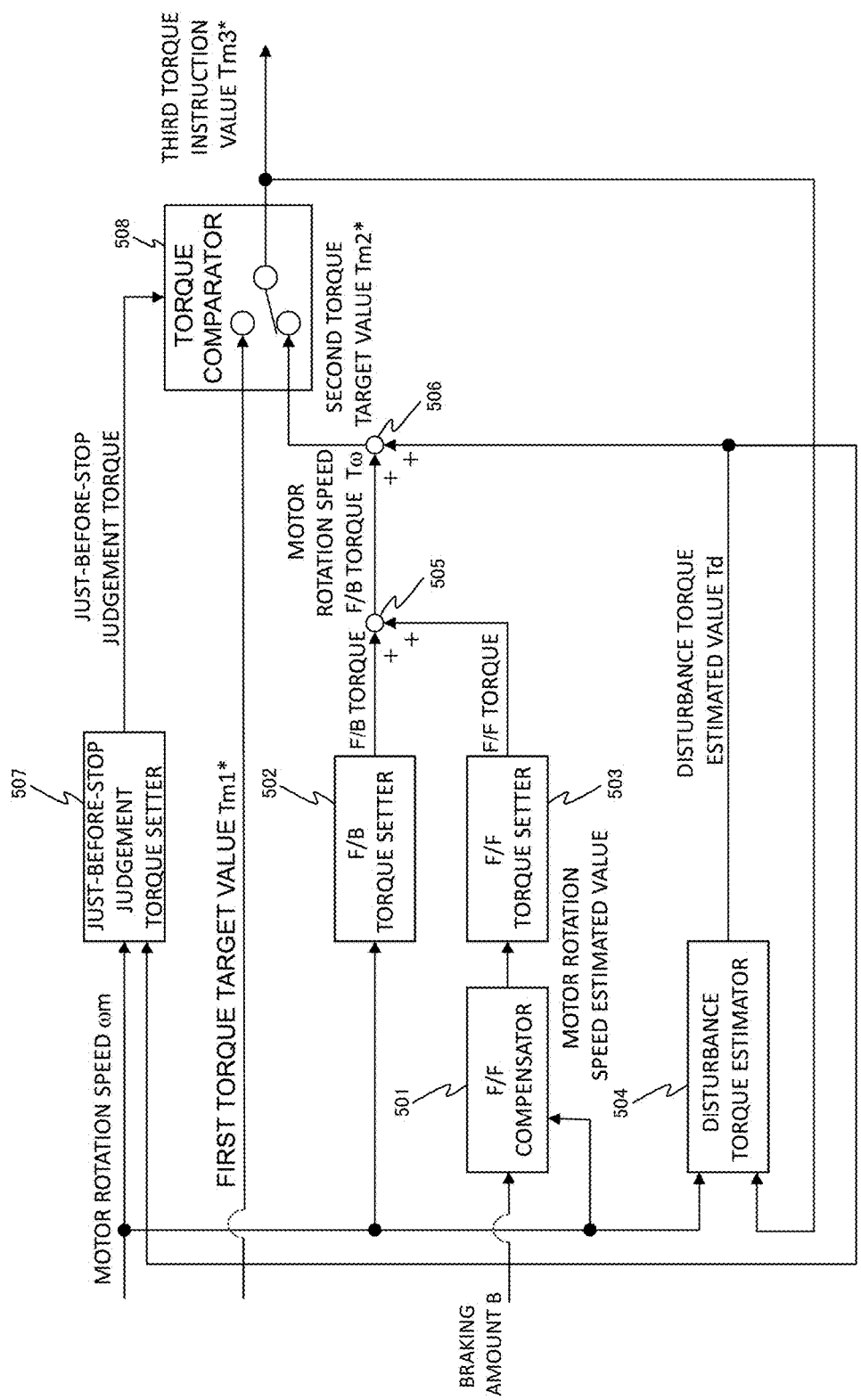
FIG. 16 is a block diagram of a stop control process in the control device for electric motor vehicle of the second embodiment.

As illustrated in FIG. 15, the process in Step S203a is performed after Step S203 (stop control process). This embodiment sets the motor torque command value Tm* calculated in Step S203 in the above-described first embodiment, that is, the motor torque command value Tm* (see FIG. 6), which is the output from the torque comparator 508, as a third torque target value Tm3* (see FIG. 16). By performing the vibration damping control process on the third torque target value Tm3*, the motor torque command value Tm* is obtained.

Figure 17:
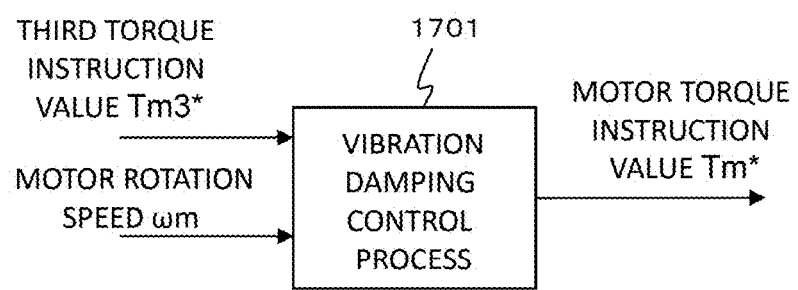
FIG. 17 is a block diagram of a vibration damping control process in the control device for electric motor vehicle of the second embodiment.

More specifically, in Step S203a, the motor torque command value Tm3* calculated in Step S203 and the motor rotation speed ωm are input to a vibration damping control block 1701 (see FIG. 17). Without sacrificing the response of a drive shaft torque, the vibration damping control block 1701 calculates the motor torque command value Tm* after the vibration damping control, which reduces a torque transmission system vibration (such as a torsional vibration of the drive shaft). The following describes an example of the vibration damping control process performed by the vibration damping control block 1701 with reference to FIG. 18.

Figure 18:
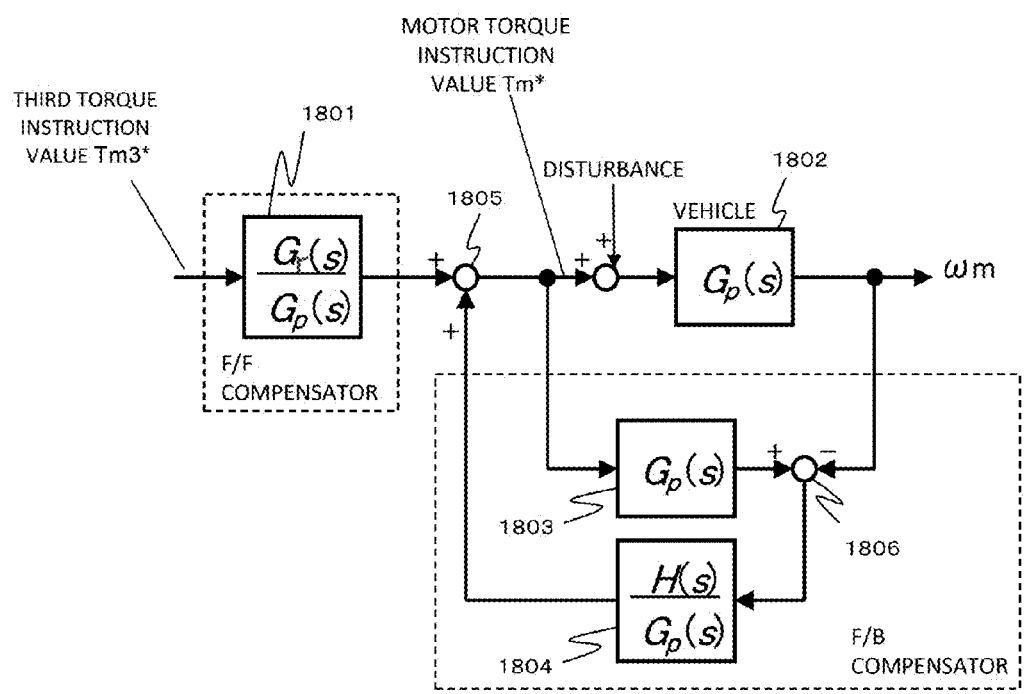
FIG. 18 is a block diagram expressing details of the vibration damping control process in the control device for electric motor vehicle of the second embodiment.

FIG. 18 is a block diagram of the vibration damping control process used in this embodiment. A feedforward compensator 1801 (hereinafter referred to as an F/F compensator) functions as a filter having a transmission characteristic Gr(s)/Gp(s), which is constituted of the transmission characteristic Gr(s) and an inverse system as the model Gp(s) for the transmission characteristic of the torque input to the vehicle and the rotation speed of the motor. By inputting the third torque target value Tm3* and performing the filtering process, the vibration damping control process by the feedforward compensation is performed. The used transmission characteristic Gr(s) can be expressed by the following Equation (14).

[Equation 14]

$$Gr(s)=Mp \cdot (s^2+2\zeta z \cdot \omega z \cdot s+\omega z^2)/s(s^2+2\omega p \cdot s+\omega p^2) \quad (14)$$

It should be noted that, the vibration damping control performed by the F/F compensator 1801 may be the vibration damping control described in JP2001-45613A or may be the vibration damping control described in JP2002-152916A.

Control blocks 1803 and 1804 are filters used for the feedback control (hereinafter the feedback is referred to as the F/B). The control block 1803 is the filter having the above-described transmission characteristic Gp(s). The control block 1803 inputs a value obtained by adding the output from the F/F compensator 1801 to the output from the control block 1804 described later, which is output from an adder 1805, and performs the filtering process. A subtractor 1806 subtracts the motor rotation speed ωm from the value output from the control block 1803. The subtracted value is input to the control block 1804. The control block 1804 is a filter having a transmission characteristic H(s)/Gp(s), which is constituted of the low-pass filter H(s) and an inverse system of the model Gp(s) for the transmission characteristic of the torque input to the vehicle and the rotation speed of the motor. The control block 1804 inputs the output from the subtractor 1806, performs the filtering process, and outputs the value calculated as an F/B compensation torque to the adder 1805.

The adder 1805 adds the third torque target value Tm3* on which the vibration damping control process has been performed by the F/F compensation to the above-described value calculated as the F/B compensation to calculate the motor torque command value Tm* to reduce the vibrations in the torque transmission system for the vehicle.

It should be noted that, the vibration damping control performed by the vibration damping control block 1701 may be the vibration damping control described in JP2003-9566A or may be the vibration damping control described in JP2010-288332A.

Figure 19:
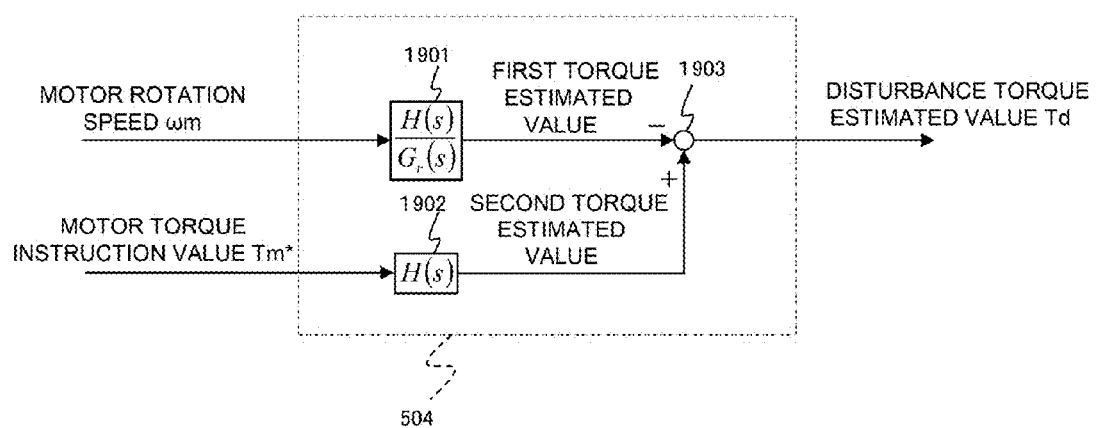
FIG. 19 is a diagram describing a method for calculating the disturbance torque estimated value in the control device for electric motor vehicle of the second embodiment.

For combination use of the vibration damping control (F/F compensator), by an algorithm of the vibration damping control, the vehicle model Gp(s) expressed by Equation (6) in the first embodiment can be regarded as the transmission characteristic Gr(s) indicated in Equation (14). Specifically, the filter having the transmission characteristic H(s)/Gp(s), which is shown in the control block 901 in FIG. 10, can be regarded as the filter having the transmission characteristic H(s)/Gr(s) as illustrated in a control block 1901 in FIG. 19.

Subsequently, the following describes a method for calculating a brake torque estimated value for combination use of the vibration damping control (F/B compensator).

Figure 20:
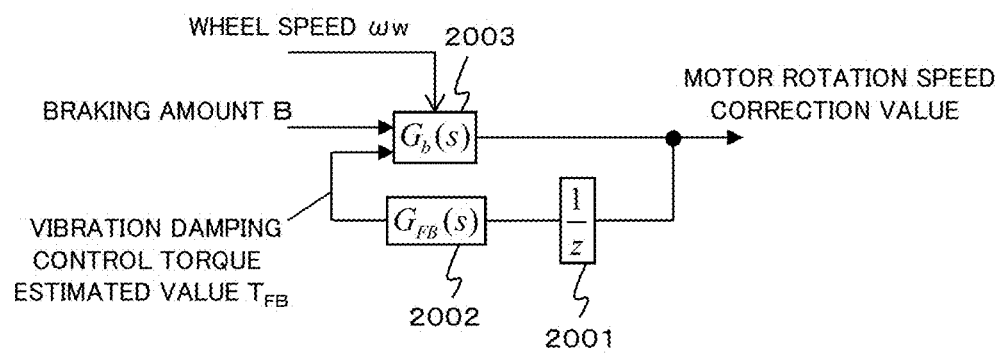
FIG. 20 is a diagram describing a method for calculating the motor rotation speed correction value in the control device for electric motor vehicle of the second embodiment.

FIG. 20 is a block diagram describing the calculation of the brake torque estimated value in combination use of the vibration damping control.

A control block 2001 sets a past value of the motor rotation speed estimated value considering the dead time. It should be noted that, the dead time here is, for example, the sensor detection delay of the vehicle.

A control block 2002 performs a vibration damping control (F/B compensator) process $G_{FB}(s)$ according to the past value of the motor rotation speed correction value set by the control block 2001 to calculate a vibration damping control torque estimated value $T_{F/B}$. The following describes the details with reference to FIG. 21.

Figure 21:
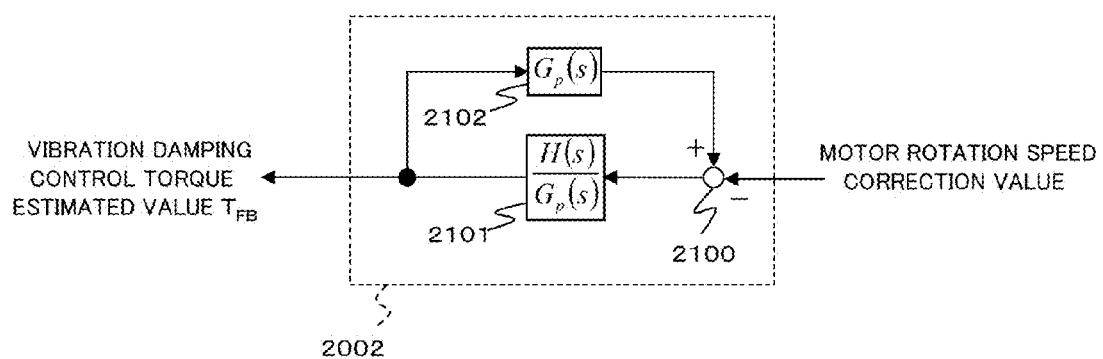
FIG. 21 is a diagram describing a method for calculating a vibration damping control torque estimated value in the control device for electric motor vehicle of the second embodiment.

FIG. 21 is a diagram describing the details of the vibration damping control (F/B compensator) process $G_{FB}(s)$ performed by the control block 2002. A control block 2101 is a filter having a transmission characteristic H(s)/Gp(s). As described above, Gp(s) is the model for the transmission characteristic of the torque input to the vehicle and the rotation speed of the motor. H(s) is a low-pass filter having such a transmission characteristic that a difference between the denominator degree and the numerator degree is equal to or more than a difference between the denominator degree and the numerator degree of a model Gp(s). A control block 2102 is a filter having the transmission characteristic Gp(s) and outputs a value obtained by inputting the output from the control block 2101 and performing the filtering process on the input value to a subtractor 2100. The subtractor 2100 subtracts the past value of the motor rotation speed correction value from the value output from the control block 2102 to output the obtained value through the subtraction to the control block 2101. Accordingly, the vibration damping control torque estimated value $T_{F/B}$ on which the vibration damping control (F/B compensator) process has been performed can be calculated from the motor rotation speed correction value.

It should be noted that, similar to the vibration damping control process in Step 203a in FIG. 15, the vibration damping control (F/B compensator) may be the vibration damping control described in JP2003-9566A or may be the vibration damping control described in JP2010-288332A.

Referring back to FIG. 20, the explanation will be continued. A control block 2003 performs the process of the transmission characteristic Gb(s) indicated in Equation (12) according to the braking amount B of the brake, the vibration damping control torque command value $T_{F/B}$, and the wheel speed ωm to calculate the motor rotation speed correction value after the vibration damping control. The adder 602 illustrated in FIG. 7 adds the motor rotation speed correction value after the vibration damping control to the motor rotation speed estimated value to correct the motor rotation speed estimated value.

When the vibration damping control, which reduces the torsional vibration of the drive shaft, is applied, the second embodiment calculates the motor rotation speed correction value using the model of the transmission characteristic considering the vibration damping control. This allows accurately canceling the braking amount of the brake from the motor rotation speed estimated value also in the case where the vibration damping control is used.

The present invention is not limited to the above-described one embodiment but various modifications and applications are possible. For example, the above-described explanation describes that, when the amount of accelerator operation is equal to or less than the predetermined value and the electric motor vehicle is just before the stop of the vehicle, the motor torque command value Tm* is converged to the disturbance torque estimated value Td (or 0) together with the reduction in the rotation speed of the electric motor 4. However, since the speed parameters such as the wheel speed, the vehicle body speed, and the rotation speed of the drive shaft are proportional relationship with the rotation speed of the electric motor 4. Accordingly, the motor torque command value Tm* may be converged to the disturbance torque estimated value Td (or 0) together with the reduction in speed parameter, which is proportionate to the rotation speed of the electric motor 4.

The invention claimed is:

1. A control device for electric motor vehicle that uses a motor as a traveling driving source, the control device for electric motor vehicle being configured to decelerate by a regenerative braking force from the motor, the control device for electric motor vehicle comprising:
   an accelerator operation amount detecting unit configured to detect an amount of an accelerator operation;
   a vehicle speed detecting unit configured to detect a speed parameter proportionate to a traveling speed of the electric motor vehicle;

a vehicle speed estimating unit configured to calculate a speed parameter estimated value according to a state of the electric motor vehicle;

a unit configured to detect or estimate a resistance component unrelated to a gradient from the vehicle state;

a speed parameter estimated value correction unit configured to correct the speed parameter estimated value according to the resistance component unrelated to the gradient;

a feedback torque calculating unit configured to calculate a feedback torque to stop the electric motor vehicle based on the speed parameter detected by the vehicle speed detecting unit;

a feedforward torque calculating unit configured to calculate a feedforward torque to compensate the feedback torque based on the speed parameter estimated value corrected by the speed parameter estimated value correction unit;

a motor torque command value calculation unit configured to calculate a motor torque command value; and a motor control unit configured to control the motor based on the motor torque command value, wherein when the amount of the accelerator operation is equal to or less than a predetermined value and the electric motor vehicle is just before a stop of the vehicle, the motor torque command value calculation unit converges the motor torque command value to 0 based on the feedback torque and the feedforward torque together with a reduction in the traveling speed.

2. The control device for electric motor vehicle according to claim 1, wherein:

the feedback torque calculating unit is configured to multiply the speed parameter detected by the vehicle speed detecting unit by a predetermined gain K1 to distribute the regenerative braking force from the motor to calculate the feedback torque, the feedforward torque calculating unit is configured to multiply the speed parameter estimated value corrected by the speed parameter estimated value correction unit by a predetermined gain K2 set according to the predetermined gain K1 to calculate the feedforward torque, and when the amount of the accelerator operation is equal to or less than the predetermined value and the electric motor vehicle is just before the stop of the vehicle, the motor torque command value calculation unit sets a speed feedback torque obtained by adding the feedforward torque to the feedback torque as the motor torque command value.

3. The control device for electric motor vehicle according to claim 1, wherein:

the resistance component unrelated to the gradient is an amount of braking of a brake to add a braking force to the vehicle, and the speed parameter estimated value correction unit includes speed parameter correction value calculation unit configured to calculate a speed parameter correction value from the braking amount of the brake, the speed parameter estimated value correction unit being configured to correct the speed parameter estimated value based on the speed parameter correction value.

4. The control device for electric motor vehicle according to claim 3, further comprising a brake operation amount detecting unit configured to detect an amount of brake operation by a driver, wherein the braking amount of the brake is decided based on the amount of brake operation detected by the brake operation amount detecting unit.

5. The control device for electric motor vehicle according to claim 3, wherein the braking amount of the brake is decided based on a command value regarding an operation of a brake.

6. The control device for electric motor vehicle according to claim 4, wherein the amount of braking of the brake is decided considering responsiveness from an input of the amount of braking of the brake to the vehicle until the braking force acts on the vehicle.

7. The control device for electric motor vehicle according to claim 3, wherein the speed parameter correction value has different signs according to a traveling direction of the vehicle.

8. The control device for electric motor vehicle according to claim 3, wherein the speed parameter correction value calculation unit is configured to calculate the speed parameter correction value using a filter including a model Gb(s) for a transmission characteristic of an input of the braking amount of the brake to the vehicle and a rotation speed of the motor.

9. The control device for electric motor vehicle according to claim 8, wherein when a vibration damping control to reduce a torsional vibration of a drive shaft is applied to the electric motor vehicle, the speed parameter correction value calculation unit is configured to calculate the speed parameter correction value using a model for a transmission characteristic considering the vibration damping control.

10. The control device for electric motor vehicle according to claim 3, wherein when the braking amount of the brake is released, the vehicle speed estimating unit is configured to initialize the speed parameter estimated value with the speed parameter.

11. The control device for electric motor vehicle according to claim 1, further comprising a disturbance torque estimating unit configured to estimate a disturbance torque, wherein when the amount of the accelerator operation is equal to or less than the predetermined value and the electric motor vehicle is just before the stop of the vehicle, the motor torque command value calculation unit converges the motor torque command value to the disturbance torque based on the feedback torque and the feedforward torque together with the reduction in the traveling speed.

12. A control method for electric motor vehicle that uses a motor as a traveling driving source, the control method for electric motor vehicle being configured to decelerate by a regenerative braking force from the motor, the control method for electric motor vehicle comprising:

detecting an amount of an accelerator operation;

detecting a speed parameter proportionate to a traveling speed of the electric motor vehicle;

estimating the speed parameter according to a state of the electric motor vehicle;

detecting or estimating a resistance component unrelated to a gradient from the vehicle state;

correcting the speed parameter according to the resistance component unrelated to the gradient;

calculating a feedback torque to stop the electric motor vehicle based on the speed parameter detected in a vehicle speed detecting step;

calculating a feedforward torque to calculate the feedforward torque for compensating the feedback torque based on the speed parameter corrected by speed parameter correction step;

calculating a motor torque command value, the motor torque command value being configured to be converged to 0 based on the feedback torque and the feedforward torque together with a reduction in the traveling speed when the amount of the accelerator operation is equal to or less than a predetermined value and the electric motor vehicle is just before a stop of the vehicle; and controlling the motor based on the motor torque command value.

* * * * *